United States Patent
Alberstein

(10) Patent No.: US 12,361,172 B2
(45) Date of Patent: Jul. 15, 2025

(54) SYSTEMS AND METHODS FOR UTILIZING HASH-DERIVED INDEXING SUBSTITUTION MODELS FOR DATA DEIDENTIFICATION

(71) Applicant: Verizon Patent and Licensing Inc., Basking Ridge, NJ (US)

(72) Inventor: Alexander Alberstein, Clifton, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 230 days.

(21) Appl. No.: 18/331,388

(22) Filed: Jun. 8, 2023

(65) Prior Publication Data
US 2024/0411926 A1    Dec. 12, 2024

(51) Int. Cl.
*G06F 21/00* (2013.01)
*G06F 21/60* (2013.01)
*G06F 21/62* (2013.01)

(52) U.S. Cl.
CPC ........ *G06F 21/6254* (2013.01); *G06F 21/602* (2013.01)

(58) Field of Classification Search
CPC ............................ G06F 21/6254; G06F 21/602
See application file for complete search history.

(56) References Cited

U.S. PATENT DOCUMENTS

| 2016/0147945 A1* | 5/2016 | MacCarthy | ........... H04W 12/02 705/51 |
| 2018/0082082 A1* | 3/2018 | Lowenberg | ........... G06F 21/602 |
| 2020/0372182 A1* | 11/2020 | Lowenberg | ........ G06Q 20/3827 |
| 2023/0021229 A1* | 1/2023 | Zimmermann | ....... H04L 9/3239 |

FOREIGN PATENT DOCUMENTS

WO    WO-2022069042 A1 *    4/2022

OTHER PUBLICATIONS

Haber et al., "Efficient signature schemes supporting redaction, pseudonymization, and data deidentification", ASIACCS '08: Proceedings of the 2008 ACM symposium on Information, computer and communications security pp. 353-362, (Year: 2008).*
"What is Data Anonymization: Pros, Cons & Common Techniques," Imperva, Website: https://www.imperva.com/learn/data-security/anonymization/, 2023, 5 Pages.

(Continued)

*Primary Examiner* — Morshed Mehedi

(57) ABSTRACT

A device may receive original data to be deidentified and may select one or more dictionaries, from a plurality of dictionaries, based on the original data. The device may sort the one or more dictionaries based on an output control key to generate one or more sorted dictionaries, and may hash the original data into one or more hash codes. The device may extract a sequence of a quantity of digits or characters, from each of the one or more hash codes, to generate one or more sequences, and may retrieve, from the one or more sorted dictionaries, one or more substitution values corresponding to the one or more sequences. The device may generate deidentified data based on the one or more substitution values, and may perform one or more actions based on the deidentified data.

20 Claims, 9 Drawing Sheets

(56) References Cited

OTHER PUBLICATIONS

"Peace of Mind—Immediate Insights," Aircloak, Website: https://aircloak.com/, 2023, 6 Pages.

"Data Anonymization: Use Cases and 6 CommonTechniques," The Satori Team at AWS Summit Toronto, Website: https://satoricyber.com/data-masking/data-anonymization-use-cases-and-6-common-techniques/, Nov. 7, 2021, 10 Pages.

Lee, "De-identification Techniques and Their Shortcomings; A Losing Game of Hide and Seek?" Towards Data Science, Website: https://towardsdatascience.com/deidentification-techniques-and-their-shortcomings-c0d2866a95b2, Mar. 30, 2021, 14 Pages.

* cited by examiner

SYSTEMS AND METHODS FOR UTILIZING HASH-DERIVED INDEXING SUBSTITUTION MODELS FOR DATA DEIDENTIFICATION

BACKGROUND

In modern computing, real-world data can be critical for testing and enhancing systems. At the same time, laws and regulations protecting sensitive portions of this real data, such as personally identifiable information (PII) and protected health information (PHI), are some of the most demanding and rigorous to date. Deidentification enables utilizing real data for purposes other than a primary purpose (e.g., real data associated with a primary purpose of completing a financial transaction, receiving medical treatment, and/or the like), while maintaining compliance with laws and regulations.

DETAILED DESCRIPTION OF EXAMPLE EMBODIMENTS

Figure 1A:
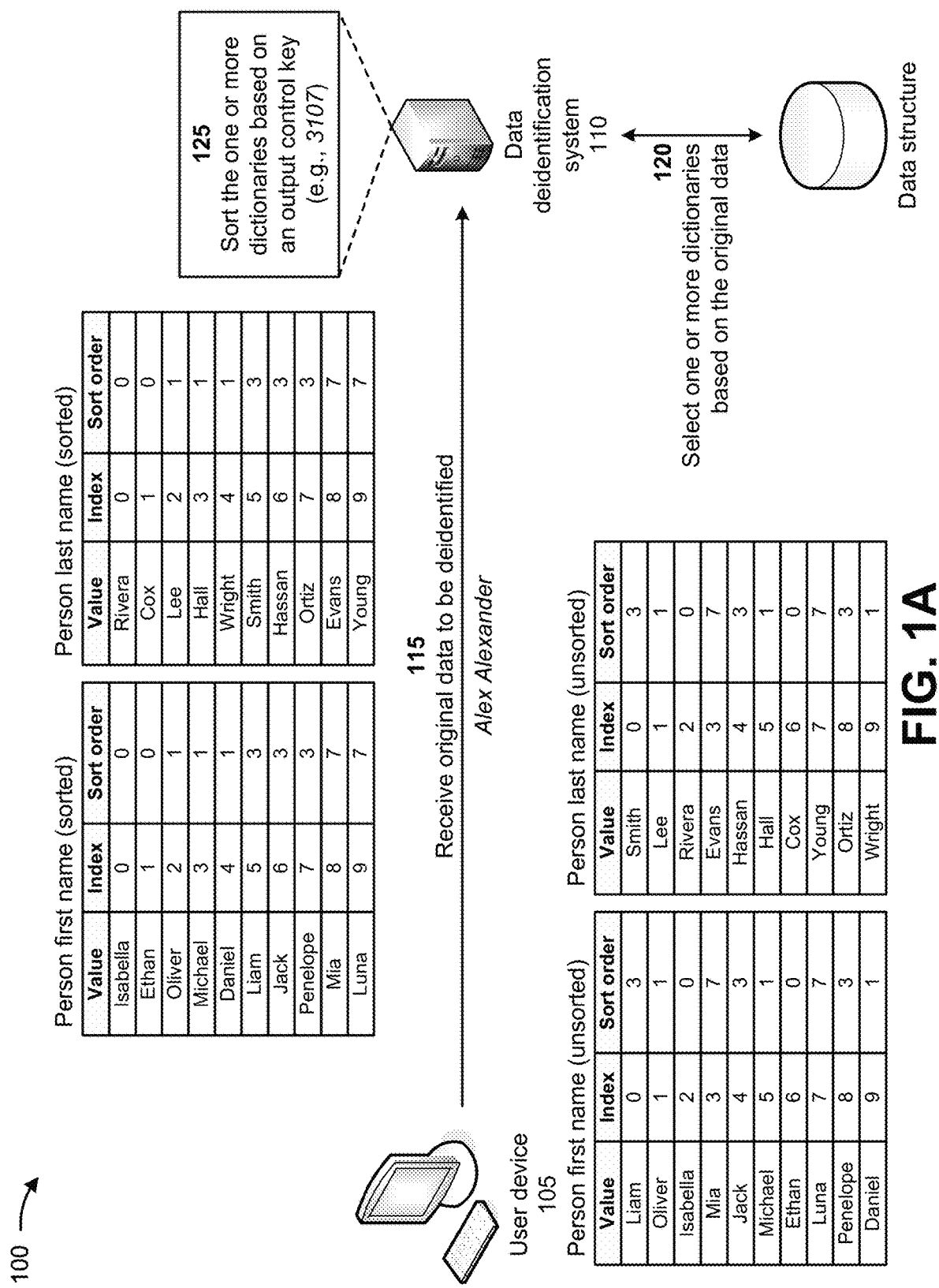
FIGS. 1A-1F are diagrams of an example associated with utilizing hash-derived indexing substitution models for data deidentification.

The following detailed description of example implementations refers to the accompanying drawings. The same reference numbers in different drawings may identify the same or similar elements.

Current techniques for deidentifying real data fail to modify the real data in a way that generates output that is truly anonymized (e.g., deidentified and non-reversable), consistent, representative, and reflective. Rather, current techniques for deidentifying real data are involved, time consuming, and expensive; require an extensive custom implementation; and are often limited to specific datastores, such as databases (e.g., since the techniques are query based). For example, a character masking technique generates an output that fails to resemble real data and is not reflective of original value changes. A data substitution technique can generate a representative output when substitution values come from a predefined list. When an original value is substituted with random values, the data substitution technique fails to generate a representative output from real data. A synthetic data technique generates an output that is not representative of real data, is not consistent with the real data, and is not reflective of the real data. A nulling out technique generates an output that is not representative of real data, and a generalization technique generates an output that is not representative of real data and is very time consuming. A data swapping technique generates an output that is not anonymized from real data, is not consistent with the real data, and is not reflective of the real data. Other techniques (e.g., perturbation, differential privacy, k-anonymity, l-diversity, t-closeness, and/or the like) also generate an output that is not consistent, not representative, and/or not reflective of real data, is not consistent with the real data, and/or is not reflective of the real data.

Thus, current techniques for deidentifying real data consume computing resources (e.g., processing resources, memory resources, communication resources, and/or the like), networking resources, and/or other resources associated with failing to generate an output that is representative of real data, failing to generate an output that is consistent with the real data, failing to generate an output that is reflective of the real data, failing to generate an output that is anonymized from the real data and/or error prone, and/or the like.

Some implementations described herein provide a data deidentification system that utilizes hash-derived indexing substitution models for data deidentification. For example, the data deidentification system may receive original data to be deidentified and may select dictionaries to utilize based on the original data. The data deidentification system may sort the dictionaries based on an output control key, and may hash the original data into hash codes. The data deidentification system may extract a sequence of a quantity of digits or characters, from each of the hash codes, to generate sequences, and may retrieve, from the sorted dictionaries, substitution values corresponding to the sequences. The data deidentification system may generate deidentified data based on the substitution values, and may utilize the deidentified data for medical research, marketing research, software development, training a machine learning model, and/or the like, without divulging the original data.

In this way, the data deidentification system utilizes hash-derived indexing substitution models for data deidentification. For example, the data deidentification system may utilize substitution from a dictionary technique, which enables an output to be representative and consistent. The data deidentification system may utilize a hash-derived indexing substitution model that provides an enhanced substitution from the dictionary technique to make substitutions non-reversable (e.g., private) and reflective, while making the substitution easier to implement (e.g., by eliminating manual mapping). The hash-derived indexing substitution model may be deterministic, such as a Jenkins's one-at-a-time hash function that returns a hash code (e.g., an integer). The hash code may be consistent and need not uniquely identify a value being hashed. That is, each distinct value being hashed may be represented by the same hash code every time this value is hashed, while the same hash code may represent multiple different values. Thus, the data deidentification system may conserve computing resources, networking resources, and/or other resources that would have otherwise been consumed by failing to generate an output that is representative of real data, failing to generate an output that is consistent with the real data, failing to generate an output that is reflective of the real data, failing to generate an output that is anonymized from the real data and/or error prone, and/or the like.

As used herein, the term "representative" may include data that closely resembles the real data it represents in terms of data and content type, size, and integrity. The term "content type" may include a utilitarian designation, a purpose of a value, such as a person or a company name, an address, a network address, a telephone number, a title, a description, a text article, and/or the like. The term "anonymization" may include an irreversible removal of a link between original data and an anonymized representation to a degree that it would be virtually impossible to reestablish the link. The term "collection" may include a group of one or more dictionaries. The term "consistent" may include an assurance of a deterministic output when the same input results in the same output. The term "data type" may include what values it can take and operations that can be performed on those values (e.g., a string, an integer, a date, Boolean, and/or the like). The term "dictionary" may include a single list or an array of values of a specific type that are used directly or as a base for substitutions of original values. The term "non-reversable" may include a one-way alteration of an original value. The term "original value" may include an input value required to be deidentified. The term "output control key" may include a key that controls how an output is generated (e.g., consistent, random, or cyclic) that enables security for the output. The term "reflective" may include substitute data that reflects changes in the original data (e.g., add, delete, and update operations performed on the original data are reflected as add, delete, and update in the corresponding data output used as a substitution of the original data). The term "security key" may include an output control key used as a cryptographic key (e.g., a secret value of a sufficient length and quality, specific to a single client, that issued or autogenerated and stored in accordance with security policies concerning cryptography). The term "substitution value" may include an output value used as a replacement of the original value. The term "theme" may include a name of a collection of dictionaries (e.g., finance, medical research, information technology, law, hospitality, and/or the like).

FIGS. 1A-1F are diagrams of an example 100 associated with utilizing hash-derived indexing substitution models for data deidentification. As shown in FIGS. 1A-1F, example 100 includes a user device 105 associated with a data deidentification system 110 and a data structure (e.g., a database, a table, a list, and/or the like). Further details of the user device 105, the data deidentification system 110, and the data structure are provided elsewhere herein.

As shown in FIG. 1A, and by reference number 115, the data deidentification system 110 may receive original data to be deidentified. For example, the original data may include real data with sensitive portions (personally identifiable information (PII), protected health information (PHI), and/or the like) to be protected by laws and regulations. The user device 105 may generate the original data, and may provide the original data to the data deidentification system 110. The data deidentification system 110 may continuously receive the original data from the user device 105 (e.g., or another source device), may periodically receive the original data from the user device 105 (e.g., or another source device), may receive the original data from the user device 105 (e.g., or another source device) based on providing a request for the original data to the user device 105, and/or the like. The data deidentification system 110 may deidentify the original data, as described herein. Deidentification enables utilizing the original or real data for purposes other than a primary purpose, while maintaining compliance with laws and regulations. For example, when the original data is a person's name, address, and credit card number, the primary purpose of the original data may be to complete a financial transaction for the person. In another example, when the original data is a person's name, address, and medical condition, the primary purpose of the original data may be to provide medical services to the person.

In some implementations, the original data may include one or more of textual data, numerical data, identifiers, dual value attributes, and/or the like. The textual data may include a person's first name, a person's last name, a person's full name, large or complex text (e.g., a project name, a title, an item description, etc.), and/or the like. The numerical data may include numbers, such as zip codes, telephone numbers, social security numbers, dates, and/or the like. The identifiers may include alphanumeric identifiers, zip codes, telephone numbers, social security numbers, dates, values used within ranges of values (e.g., ages), and/or the like. The dual value attributes may include yes or no attributes, male or female attributes, true or false attributes, and/or the like. In one example, as shown in FIG. 1A, the original data may include textual data, such as a person's first name and last name (e.g., Alex Alexander).

As further shown in FIG. 1A, and by reference number 120, the data deidentification system 110 may select one or more dictionaries based on the original data. For example, the data deidentification system 110 may be associated with the data structure, and the data structure may store a plurality of dictionaries. The plurality of dictionaries may include a standard set of dictionaries for textual data, numerical data, identifiers, dual value attributes, and/or the like. In some implementations, the plurality of dictionaries may include one or more custom dictionaries, such as collections of dictionaries based on similar topics (e.g., finance, medical research, information technology, law, hospitality, and/or the like). The plurality of dictionaries may be shared by multiple collections. For example, dictionaries associated with a person's first name and a person's last name may be referenced from general business, medical, military, and/or the like theme collections.

In some implementations, the data deidentification system 110 may select the one or more dictionaries from the plurality of dictionaries stored in the data structure based on the original data. For example, if the field in the original data is for a person's first name and/or last name, the data deidentification system 110 may select an unsorted person first name dictionary and an unsorted person last name dictionary from the plurality of dictionaries stored in the data structure. In some implementations, the data deidentification system 110 may dynamically load the one or more dictionaries, from the plurality of dictionaries, through code. For example, the data deidentification system 110 may provide a set of functions that select a custom dictionary with each call (e.g., SubstituteString(text, customDictionary), SubstituteInteger(integer, customDictionary), Substitute Float(float, customDictionary), SubstituteDate(date, customDictionary), and/or the like). For custom dictionary functions, a length of an index may be determined dynamically based on a length of the custom dictionary.

The names of the functions, dictionaries, and/or the like, referred to herein, are only examples. The names and notation used for each particular implementation may vary based on local conventions, standards, and/or preferences. For example, if the data deidentification system 110 is implemented with an object orientated language, based on how the classes are structured and instantiated, a reference to an account number method and/or function may be: Substitute.AccountNumber, sub.unique.integer, xsa.AnonymizeAccount, xsa.Anonymize.Account, and/or the like. If the data deidentification system 110 is implemented with a procedural language, the names may be: SubstituteAccountNumber, subAcct, AnonymizeAccount, and/or the like. Depending on how diverse the output is to be, sizes of dictionaries may include ten, one hundred, one thousand, and/or the like items, with corresponding index ranges of zero to nine, zero to ninety nine, zero to nine hundred and ninety nine, and/or the like. A size of a dictionary may determine a quantity of digits in a hash code used for referencing the dictionary. To avoid orphan references, the dictionaries may include enough items to accommodate a full range of an index.

As further shown in FIG. 1A, and by reference number 125, the data deidentification system 110 may sort the one or more dictionaries based on an output control key. For example, the data deidentification system 110 may utilize an output control key (e.g., "3107") to control how an output is generated by the data deidentification system 110. If the same output control key is used for every execution, the data deidentification system 110 may generate the same output (e.g., deidentified data) for the same input (e.g., original data). If the original data changes, the deidentified data may change accordingly. Such an approach may generate outputs that are consistent, yet reflective, across multiple executions. If a random output is required, before each execution, the data deidentification system 110 may generate a random output control key instead of a permanent or static output control key. If cyclical output is required, the data deidentification system 110 may iterate through a list of output control keys to produce a repetitive sequence of outputs, where each output may correspond to a specific output control key in the list. In some implementations, the output control key may be stored and handled as a cryptographic key to ensure privacy for the original data (e.g., by making the output nonreversible). In some implementations, a sequence may be used as a substitution value identifier, such as an index or a key (e.g., for custom dictionary functions, a length of an index may be determined dynamically based on a length of the custom dictionary).

In some implementations, during initialization, the data deidentification system 110 may sort the one or more dictionaries based on the output control key to make indexes of specific substitution values unique for each output control key and to generate one or more sorted dictionaries. Sorting the one or more dictionaries based on the output control key (e.g., a security key) may provide a significant increase in performance over encrypting each individual hash code, while comparably enhancing security. In some implementations, when sorting the one or more dictionaries based on the output control key to generate the one or more sorted dictionaries, the data deidentification system 110 may generate a hash code from the output control key, and may determine an index based on the hash code. For example, the data deidentification system 110 may utilize a quantity of digits of the hash code (e.g., based on lengths of the one or more dictionaries) as an index for the one or more dictionaries to retrieve substitution values. The data deidentification system 110 may perform an operation (e.g., an exclusive or (XOR)) based on the index to generate a sort order for the one or more dictionaries, and may sort the one or more dictionaries based on the sort order to generate the one or more sorted dictionaries. In one example, the data deidentification system 110 may sort the unsorted person first name dictionary and the unsorted person last name dictionary based on the output control key to generate a sorted person first name dictionary and a sorted person last name dictionary.

Figure 1B:
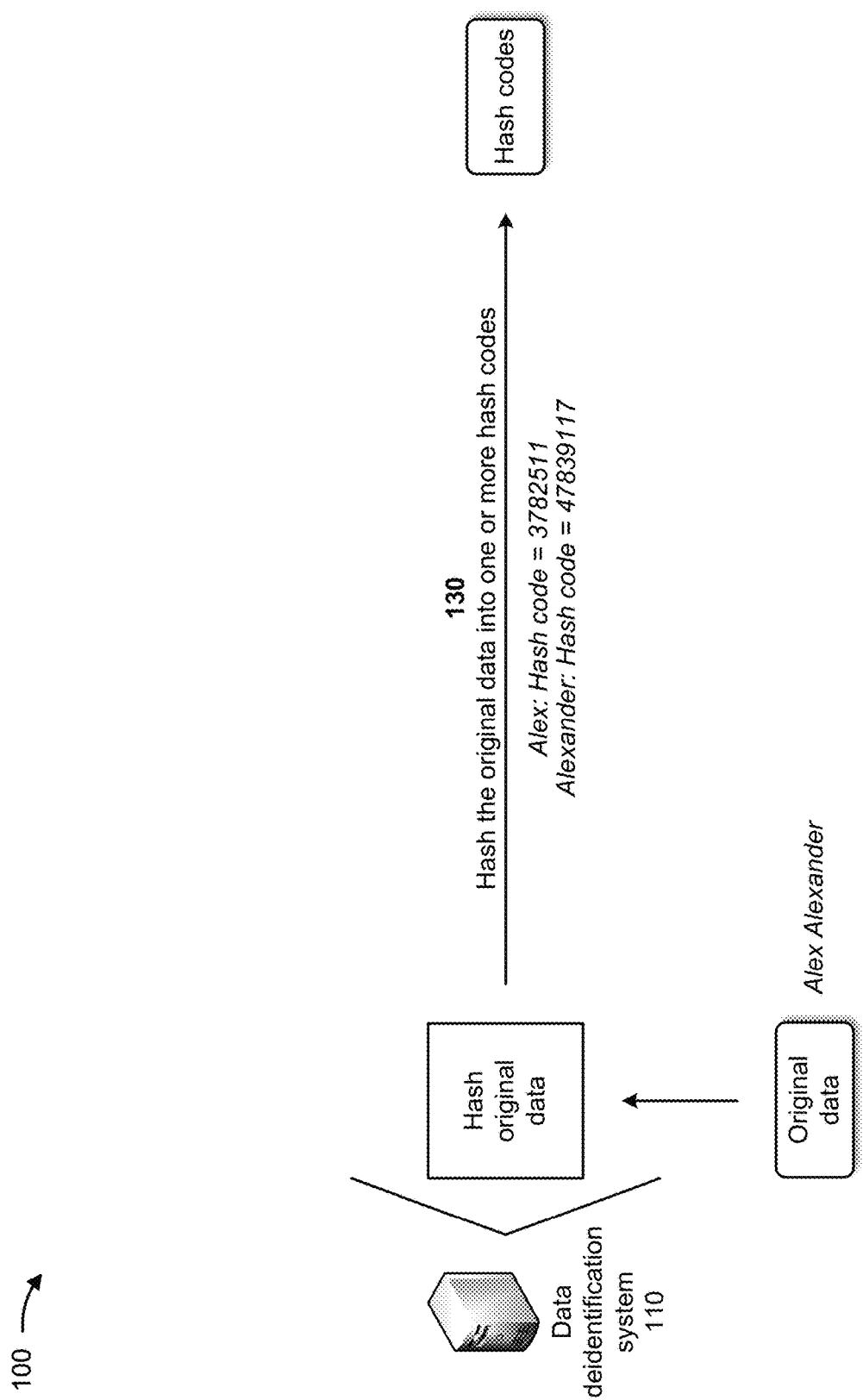

As further shown in FIG. 1B, and by reference number 130, the data deidentification system 110 may hash the original data into one or more hash codes. For example, the data deidentification system 110 may hash one or more original values of the original data into one or more deterministic representations (e.g., hash codes) of the one or more original values. In some implementations, the data deidentification system 110 may convert the one or more hash codes into substitution value identifiers (e.g., one or more integers, indexes, or keys) to help prevent reverse identification of the original data. In one example, as shown in FIG. 1B, the data deidentification system 110 may hash the person's first name (e.g., Alex) into a first hash code (e.g., 3782511) and may hash the person's last name (e.g., Alexander) into a second hash code (e.g., 47839117).

Figure 1C:
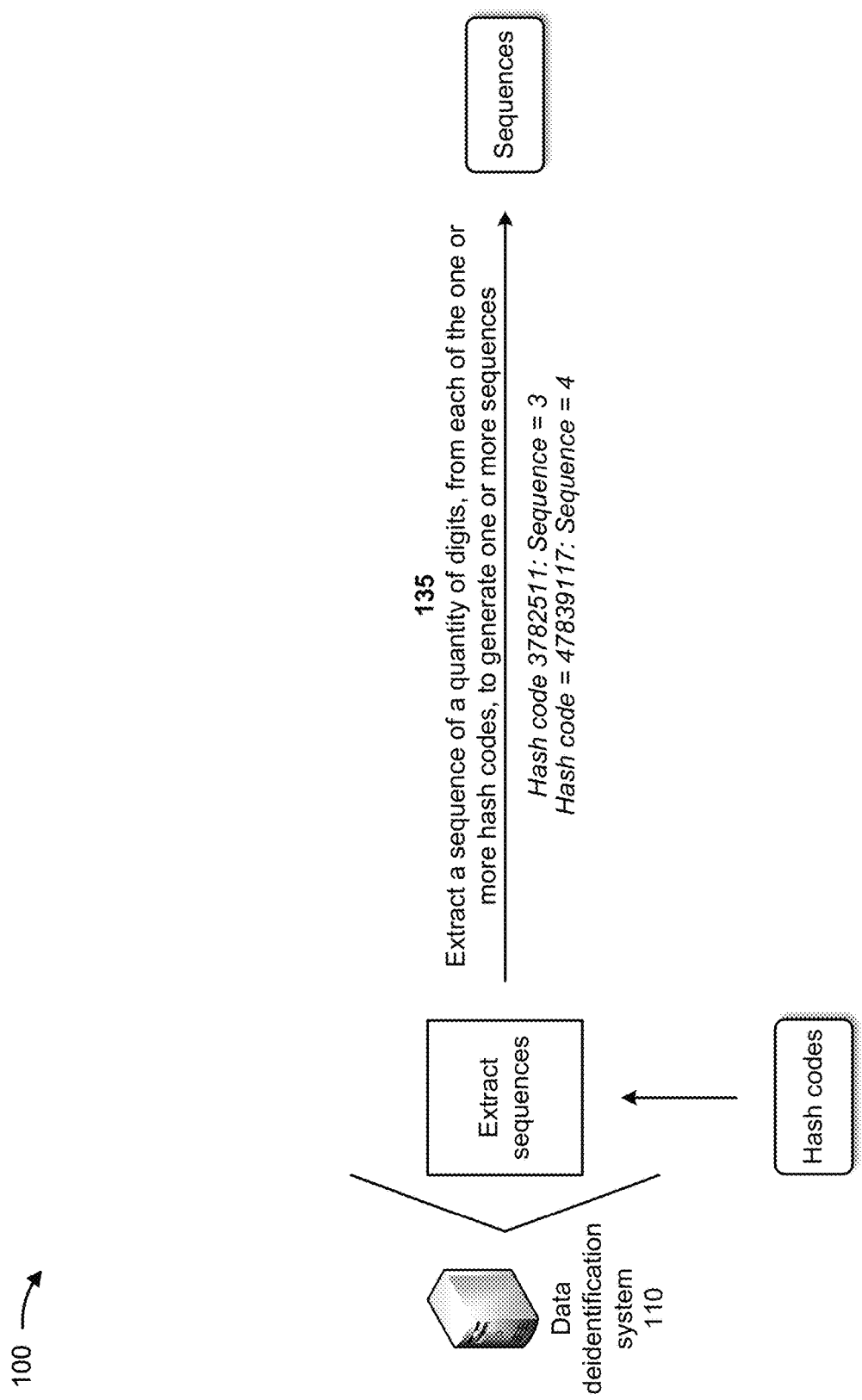

As shown in FIG. 1C, and by reference number 135, the data deidentification system 110 may extract a sequence of a quantity of digits, from each of the one or more hash codes, to generate one or more sequences that may be used as substitution value identifiers, as a reference to substitution value identifiers, and/or as seed values for substitution value identifiers. For example, the data deidentification system 110 may identify a quantity (N) of digits (e.g., as one, at position one (first digit)) that is less than or equal to a total quantity of digits in each of the one or more hash codes. The data deidentification system 110 may extract the sequence of the identified quantity of digits, from each of the one or more hash codes, to generate the one or more sequences. In one example, as shown in FIG. 1C, the data deidentification system 110 may identify the quantity (N) of digits as one, which is less than a total quantity of digits (e.g., seven and eight) in each of the one or more hash codes. The data deidentification system 110 may extract a first sequence (e.g., 3) of one digit from the first hash code (e.g., 3782511) that is a first digit of the first hash code, and may extract a second sequence (e.g., 4) of one digit from the second hash code (e.g., 47839117) that is a first digit of the second hash code.

Figure 1D:
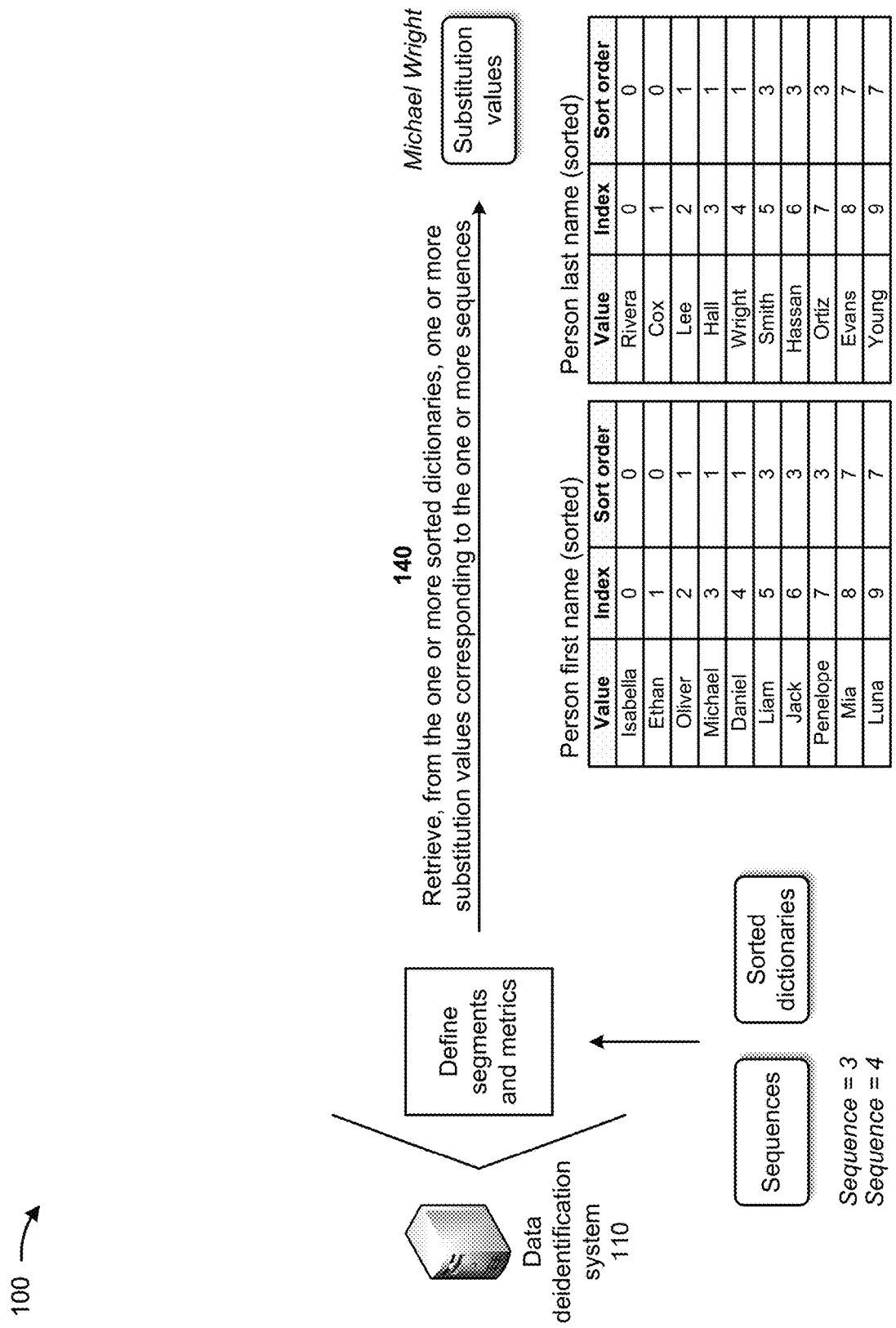

As shown in FIG. 1D, and by reference number 140, the data deidentification system 110 may retrieve, from the one or more sorted dictionaries, one or more substitution values corresponding to the one or more sequences. For example, the data deidentification system 110 may utilize the one or more sequences as indexes to retrieve, from the one or more sorted dictionaries, the one or more substitution values corresponding to the one or more sequences. In some implementations, the one or more substitution values may substantially resemble original values of the original data. For example, if the original values are a first name and a last name, the substitution values may be a different first name and a different last name (e.g., rather than numbers, attributes, and/or the like). In some implementations, each original value, of the original data, may correspond to a single substitution value or multiple substitution values. In some implementations, the one or more substitution values may change based on a change to original values of the original data. This may prevent reverse identification of the original values of the original data, which may maintain compliance with privacy laws and regulations.

In one example, as shown in FIG. 1D, the data deidentification system 110 may identify the first sequence (e.g., 3) in the index column of the sorted person first name dictionary, and may identify a first substitution value (e.g., Michael) corresponding to the first sequence. The data deidentification system 110 may identify the second sequence (e.g., 4) in the index column of the sorted person last name dictionary, and may identify a second substitution value (e.g., Wright) corresponding to the second sequence.

Figure 1E:
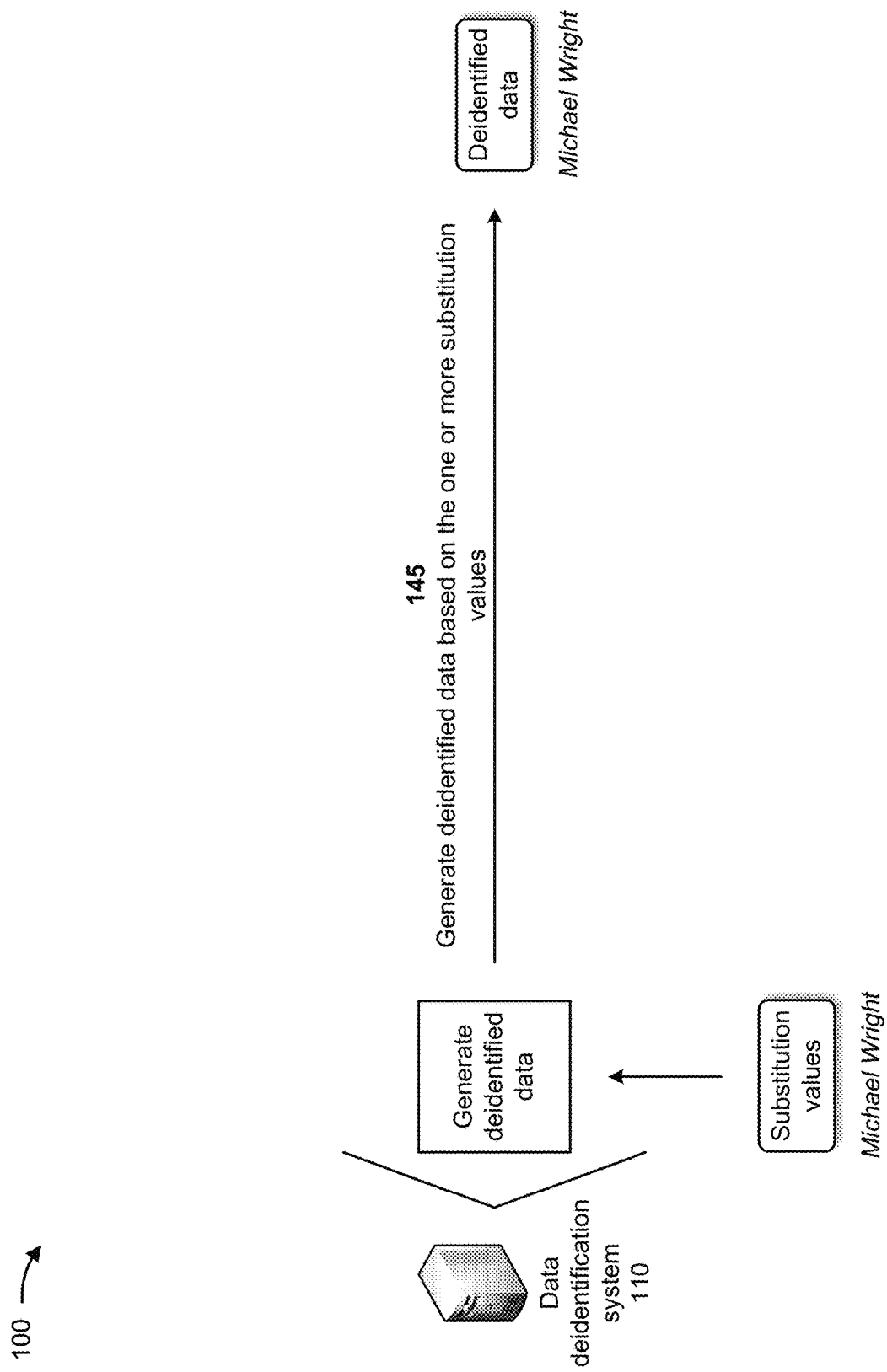

As shown in FIG. 1E, and by reference number 145, the data deidentification system 110 may generate deidentified data based on the one or more substitution values. For example, the data deidentification system 110 may utilize the one or more substitution values in place of the one or more original values of the original data to generate the deidentified data. In one example, as shown in FIG. 1E, the data deidentification system 110 may utilize the first substitution value (e.g., Michael) in place of the first original value (e.g., the first name Alex) and may utilize the second substitution value (e.g., Wright) in place of the second original value (e.g., the last name Alexander) to generate the deidentified data (e.g., Michael Wright).

In this way, the data deidentification system 110 may provide substitution values that closely resemble original values, which satisfies representative output requirements. The data deidentification system 110 may utilize a portion of the hash code or a whole hash code as an index, which makes the index not unique for each original value, and makes an original value correspond to multiple substitution values. Additionally, utilizing the output control key as a security key enables the data deidentification system 110 to sort dictionaries in the way that makes indexes of specific substitution values unknown to a potential perpetrator, even if the perpetrator obtains copies of dictionaries. This satisfies a non-reversable output requirement. The data deidentification system 110 eliminates manual mapping since an index to a corresponding substitution value of an original value is derived from a hash code of the original value. The data deidentification system 110 may utilize a deterministic hashing model that ensures that an index is always the same for the same original value and that the substitution value will change if the original value changes. This satisfies consistent and reflective output requirements. The data deidentification system 110 may utilize the output control key to produce an output that is consistent, random, or cyclic. This satisfies the consistent, random, or cyclic output requirements.

Figure 1F:
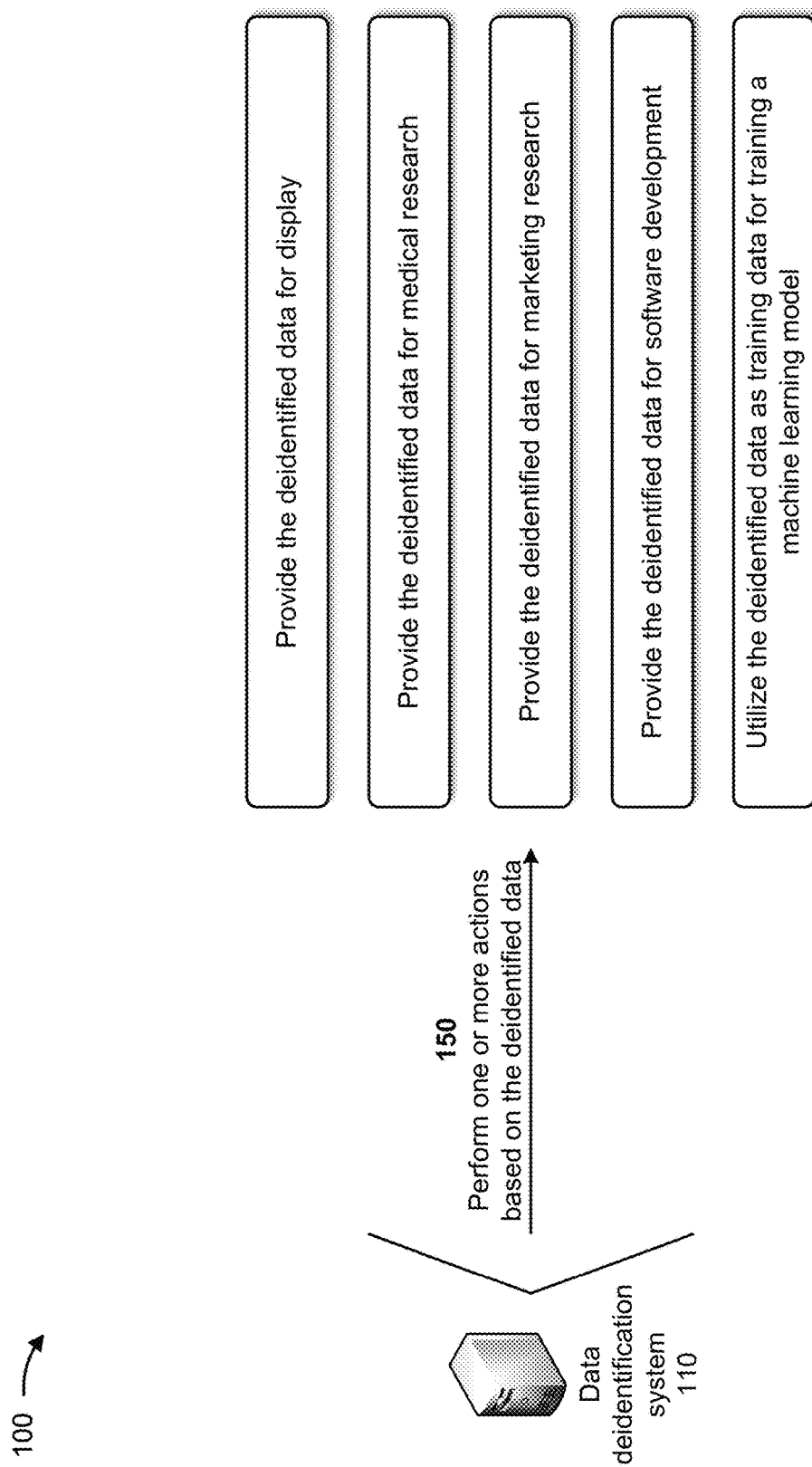

As shown in FIG. 1F, and by reference number 150, the data deidentification system 110 may perform one or more actions based on the deidentified data. In some implementations, performing the one or more actions includes the data deidentification system 110 providing the deidentified data for display. For example, the data deidentification system 110 may provide the deidentified data to the user device 105. The user device 105 may receive the deidentified data and provide the deidentified data for display to a user of the user device 105. The user may determine whether the deidentified data is acceptable, should be modified, should be discarded, and/or the like. In this way, the data deidentification system 110 conserves computing resources, networking resources, and/or other resources that would have otherwise been consumed by failing to generate an output that is representative of real data.

In some implementations, performing the one or more actions includes the data deidentification system 110 providing the deidentified data for medical research. For example, the data deidentification system 110 may provide the deidentified data to medical researchers without violating any laws or regulations. The medical researchers may utilize the deidentified data to answer questions beyond those determined in the original data while protecting privacy of participating individuals and/or organizations. In this way, the data deidentification system 110 conserves computing resources, networking resources, and/or other resources that would have otherwise been consumed by failing to generate an output that is consistent with the real data.

In some implementations, performing the one or more actions includes the data deidentification system 110 providing the deidentified data for marketing research. For example, the data deidentification system 110 may provide the deidentified data to marketing researchers without violating any privacy laws or regulations. The marketing researchers may utilize the deidentified data to identify current trends, demand, and/or the like associated with products and/or services, while remaining compliant with privacy laws. In this way, the data deidentification system 110 conserves computing resources, networking resources, and/or other resources that would have otherwise been consumed by failing to generate an output that is anonymized from the real data and/or error prone.

In some implementations, performing the one or more actions includes the data deidentification system 110 providing the deidentified data for software development. For example, the data deidentification system 110 may provide the deidentified data to software developers without violating any laws or regulations. The software developers may utilize the deidentified data to perform analysis, design, implementation, and testing of software without exposing sensitive information. In this way, the data deidentification system 110 conserves computing resources, networking resources, and/or other resources that would have otherwise been consumed by failing to generate an output that is reflective of the real data.

In some implementations, performing the one or more actions includes the data deidentification system 110 utilizing the deidentified data as training data for training a machine learning model. For example, the data deidentification system 110 may store the deidentified data with training data, and may utilize the training data to train a machine learning model without violating any laws or regulations. In this way, the data deidentification system 110 conserves computing resources, networking resources, and/or other resources that would have otherwise been consumed by failing to generate an output that is representative of real data, failing to generate an output that is consistent with the real data, failing to generate an output that is reflective of the real data, failing to generate an output that is anonymized from the real data and/or error prone, and/or the like.

In some implementations, the data deidentification system 110 may utilize the following pseudocode of sample functions for substituting a person's first name, last name, and full name.

```
Function Main
    // Initialization
    Sort all dictionaries by output control key
    Load PersonFirstNames array from the Person First Name dictionary
    Load PersonLastNames array from the Person Last Name dictionary
    Print GetSubstitutionFirstName("Alex") //Hash code: 3782511, index: 3
    //Output: Michael
    Print GetSubstitutionLastName("Alexander") //Hash code: 47839117, index: 4
    //Output: Wright
    Print GetSubstitutionFullName("Alex M Alexander") //Hash codes: 3782511,
10045212, 47839117; indexes: 3, 1 (first letter of Oliver), 4
```

```
//Output: Michael O Wright
end function
function String GetSubstitutionFirstName (String OriginalValue)
    Integer hash = GetHash (OriginalValue)
    // Get the leftmost digit of the hash
    Integer index = hash modulo 10
    // Return the substitution for the specified first name from the array containing person
first names
    Return PersonFirstNames [index]
end function
Function String GetSubstitutionLastName (String OriginalValue)
    Integer hash = GetHash (OriginalValue)
    // Get the rightmost digit of the hash
    Integer index = hash modulo 10
    // Return the substitution for the specified last name from the array
    // containing person first names
    return PersonLastNames [index]
end function
function String GetSubstitutionFullName (String OriginalValue)
// Name parts are separated by space. Get them into an array
StringArray arrayNameParts = Split(OriginalValue, " ")
String fullNameSubstitution
String part
// Start with a substitution of the first name
fullNameSubstitution = GetSubstitutionFirstName(arrayNameParts[0])
//if the original full name has a middle name or an initial
If Length(arrayNameParts) > 2
    // Get the substitution of the middle part
    part = GetSubstitutionFirstName(arrayNameParts[1])
    //if the middle part is 1 charter long
    If Len(arrayNameParts[1]) == 1
        // Use the leftmost character of the corresponding first name substitution as an
initial
        part = Left(part, 1)
    end if
    // Add the resulted middle part substitution to the full name substitution
    fullNameSubstitution = fullNameSubstitution + " " + part
        //Process the third part; Could be a last name or an initial
        // If an initial
        If Len(arrayNameParts[2]) == 1
            // Use the leftmost character of the corresponding first name substitution as
Initial
            part = GetSubstitutionFirstName(arrayNameParts[2])
            part = Left(part, 1)
        else
            // Use the last name substitution
            part = GetSubstitutionLastName(arrayNameParts[2])
        end if
        // Add the resulted Last part substitution to the full name substitution
        fullNameSubstitution = fullNameSubstitution + " " + part
    else
        // Two part name - Just add the Last name substitution to the full name
substitution
        fullNameSubstitution = fullNameSubstitution + " " +
GetSubstitutionLastName(arrayNameParts[1])
    end if
    return fullNameSubstitution
end function
```

While a sequence may derive from a hash code in a variety of ways, in this particular example a sequence location may be defined as a first digit of a hash code. If that is the case, then the sequences should be 3 and 4. Also, while possible, it may unnecessarily complicate the model to dynamically define the sequence location based on input (e.g., if ends with x, then last digit, if ends with r then first digit). In some implementations, at least two digits, or an equivalent combination of characters, of the hash code may be used as an index or a key into a list of the substitution values. An at least two digit index may be recommended to provide a reasonably diverse output.

For original data that includes non-unique numbers, the data deidentification system 110 may construct a substitution value using elements from a dictionary of numbers appended to each other until the desired length and precision are attained. The indexes into the dictionary of numbers may be retrieved from a hash of a string representation of the original value. For original data that includes unique identifiers, the data deidentification system 110 may preserve uniqueness and/or distinctiveness using the following procedure: the number is hashed as a string; a specific part of the hash code (e.g., the last two digits) is used as an index into the numbers dictionary; a resulting number is XORed with the security key; a resulting number is XORed with the original value; and the result of the XOR operations is returned as the substitution value. To preserve referential integrity, all corresponding data elements in the scope of a pertinent dataset must be altered in the same way. For example, if a number is a primary key, all corresponding foreign keys must be deidentified as unique numbers, utilizing the same function (e.g., entityPK=DeidentifyUniqueNumber(entityPK);
entityFK=DeidentifyUniqueNumber(entityFK)).

In instances when the original data (e.g., an identifier) is alphanumeric, the number may be converted to a hexadecimal representation. In cases when a specific custom format is required, the data deidentification system 110 may provide a callback option for a custom formator (e.g., a pointer/delegate parameter or a property).

If the substitution value has to be within a specific range, the data deidentification system 110 may utilize the following procedure.

```
SubstituteAgeWithinRange (originalAge)
  Hash originalAge as a string
  Get index into a substitution dictionary
    (e.g., as the last digit of the hash code)
  If age between 10 and 20
    Get the substitution value from the tenTo20Dictinary
  If age between 20 and 30
    Get the substitution value from the twentyTo30Dictinary
```

In this way, the data deidentification system 110 utilizes hash-derived indexing substitution models for data deidentification. For example, the data deidentification system 110 may utilize substitution from a dictionary technique, which enables an output to be representative and consistent. The data deidentification system 110 may utilize a hash-derived indexing substitution model that provides an enhanced substitution from the dictionary technique to make substitutions non-reversable (e.g., private) and reflective, while making the substitution easier to implement (e.g., by eliminating manual mapping). The hash-derived indexing substitution model may be deterministic, such as a Jenkins's one-at-a-time hash function that returns a hash code (e.g., an integer). The hash code may be consistent and need not uniquely identify a value being hashed. That is, each distinct value being hashed may be represented by the same hash code every time this value is hashed, while the same hash code may represent multiple different values. Thus, the data deidentification system 110 may conserve computing resources, networking resources, and/or other resources that would have otherwise been consumed by failing to generate an output that is representative of real data, failing to generate an output that is consistent with the real data, failing to generate an output that is reflective of the real data, failing to generate an output that is anonymized from the real data and/or error prone, and/or the like.

In some implementations, the data deidentification system 110 may exhibit a strong avalanche effect (e.g., the avalanche effect indicates that, for a good cipher, changes in plaintext affect ciphertext) and produce a completely different output for a minimally changed input. The hash-derived indexing substitution model may be deterministic, and may exhibit a strong avalanche effect. The hash-derived indexing substitution model may utilize a deterministic hash function that may exhibit a strong avalanche effect. The hash-derived indexing substitution model may utilize a hashing function that is deterministic in order for the output to be consistent. If an inconsistent output is required, the output control key may be regenerated before each execution of the data deidentification process. This enables both a consistent output and an inconsistent output without having to switch hashing functions.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
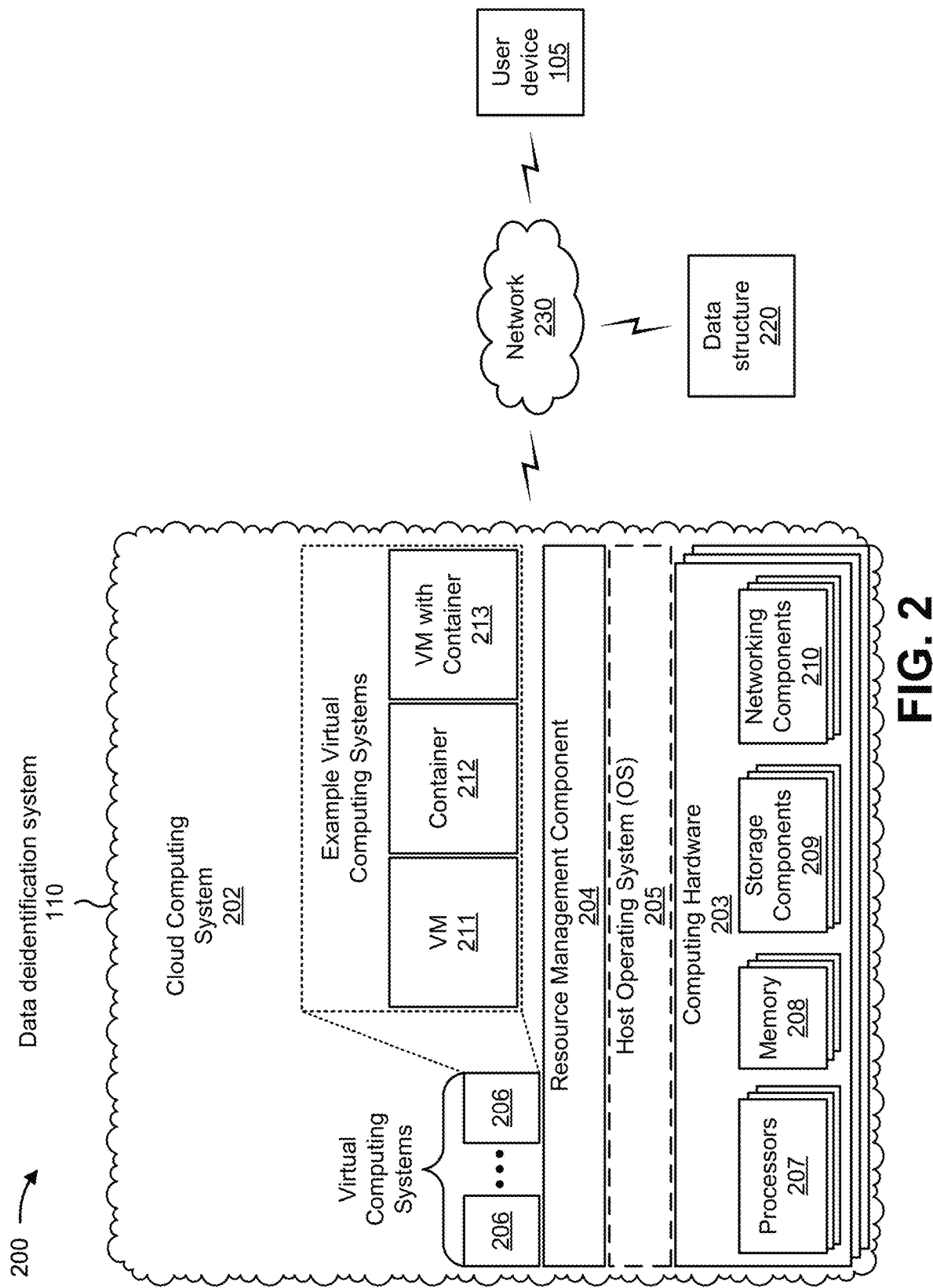
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the data deidentification system 110, which may include one or more elements of and/or may execute within a cloud computing system 202. The cloud computing system 202 may include one or more elements 203-213, as described in more detail below. As further shown in FIG. 2, the environment 200 may include the user device 105, a data structure 220, and/or a network 230. Devices and/or elements of the environment 200 may interconnect via wired connections and/or wireless connections.

The user device 105 may include one or more devices capable of receiving, generating, storing, processing, and/or providing information, as described elsewhere herein. The user device 105 may include a communication device and/or a computing device. For example, the user device 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using the computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the data deidentification system 110 may include one or more elements 203-213 of the cloud computing system 202, may execute within the cloud computing system 202, and/or may be hosted within the cloud computing system 202, in some implementations, the data deidentification system 110 may not be cloud-based (e.g., may be implemented outside of a cloud computing system) or may be partially cloud-based. For example, the data deidentification system 110 may include one or more devices that are not part of the cloud computing system 202, such as the device 300 of FIG. 3, which may include a standalone server or another type of computing device. The data deidentification system 110 may perform one or more operations and/or processes described in more detail elsewhere herein.

The data structure 220 may include one or more devices capable of receiving, generating, storing, processing, and/or providing information, as described elsewhere herein. The data structure 220 may include a communication device and/or a computing device. For example, the data structure 220 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data structure 220 may communicate with one or more other devices of the environment 200, as described elsewhere herein.

The network 230 includes one or more wired and/or wireless networks. For example, the network 230 may include a cellular network, a public land mobile network (PLMN), a local area network (LAN), a wide area network (WAN), a private network, the Internet, and/or a combination of these or other types of networks. The network 230 enables communication among the devices of the environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
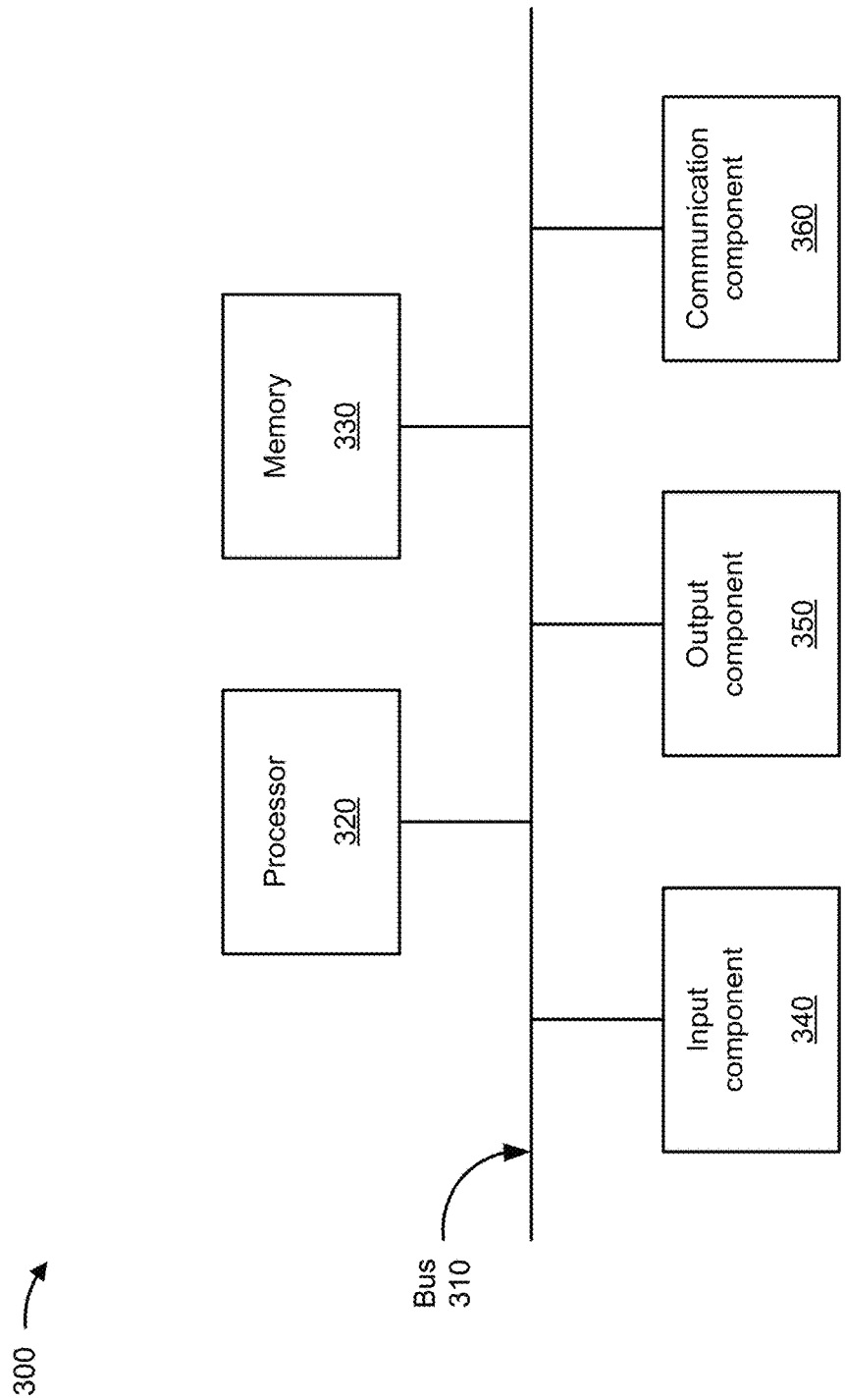
FIG. 3 is a diagram of example components of one or more devices of FIG. 2.

FIG. 3 is a diagram of example components of a device 300, which may correspond to the user device 105, the data deidentification system 110, and/or the data structure 220. In some implementations, the user device 105, the data deidentification system 110, and/or the data structure 220 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
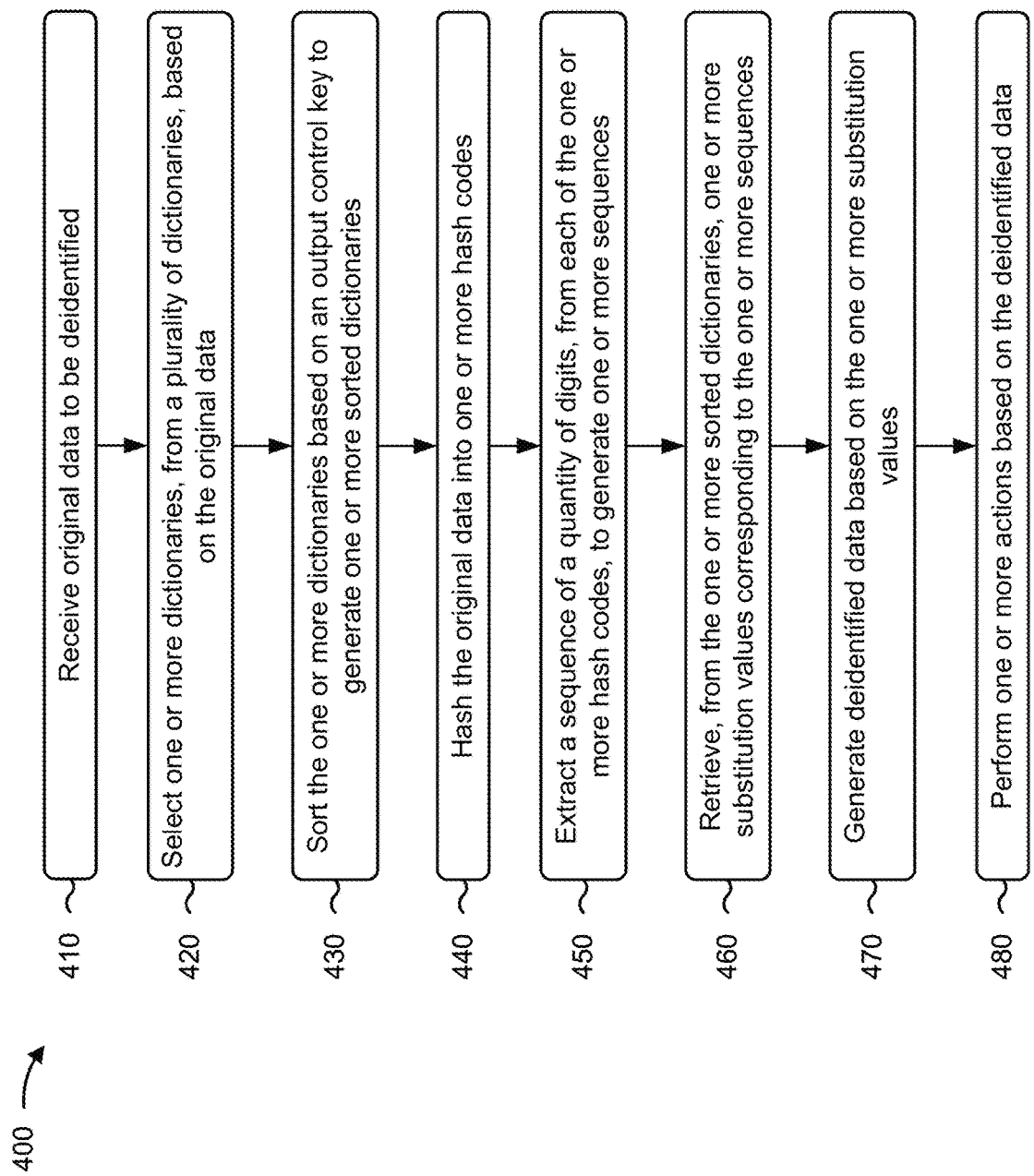
FIG. 4 is a flowchart of an example process for utilizing hash-derived indexing substitution models for data deidentification.

FIG. 4 is a flowchart of an example process 400 for utilizing hash-derived indexing substitution models for data deidentification. In some implementations, one or more process blocks of FIG. 4 may be performed by a device (e.g., the data deidentification system 110). In some implementations, one or more process blocks of FIG. 4 may be performed by another device or a group of devices separate from or including the device, such as a user device (e.g., the user device 105), and/or the like. Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving original data to be deidentified (block 410). For example, the device may receive original data to be deidentified, as described above. In some implementations, the original data includes one or more of textual data, numerical data, identifiers, or dual value attributes.

As further shown in FIG. 4, process 400 may include selecting one or more dictionaries, from a plurality of dictionaries, based on the original data (block 420). For example, the device may select one or more dictionaries, from a plurality of dictionaries, based on the original data, as described above.

As further shown in FIG. 4, process 400 may include sorting the one or more dictionaries based on an output control key to generate one or more sorted dictionaries (block 430). For example, the device may sort the one or more dictionaries based on an output control key to generate one or more sorted dictionaries, as described above. In some implementations, the output control key is one of a random key or a static key. In some implementations, the output control key is a cryptographic key used for sorting. In some implementations, sorting the one or more dictionaries based on the output control key to generate the one or more sorted dictionaries includes generating a hash code from the output control key, determining an index based on the hash code, performing an exclusive or operation based on the index to generate a sort order, and sorting the one or more dictionaries based on the sort order to generate the one or more sorted dictionaries.

As further shown in FIG. 4, process 400 may include hashing the original data into one or more hash codes (block 440). For example, the device may hash the original data into one or more hash codes, as described above.

As further shown in FIG. 4, process 400 may include extracting a sequence of a quantity of digits, from each of the one or more hash codes, to generate one or more sequences (block 450). For example, the device may extract a sequence of a quantity of digits, from each of the one or more hash codes, to generate one or more sequences, as described above. In some implementations, the quantity of digits is less than or equal to a quantity of digits in each of the one or more hash codes.

As further shown in FIG. 4, process 400 may include retrieving, from the one or more sorted dictionaries, one or more substitution values corresponding to the one or more sequences (block 460). For example, the device may retrieve, from the one or more sorted dictionaries, one or more substitution values corresponding to the one or more sequences, as described above. In some implementations, the one or more substitution values substantially resemble original values of the original data. In some implementations, each original value, of the original data, corresponds to a single substitution value. In some implementations, the one or more substitution values change based on a change to original values of the original data.

As further shown in FIG. 4, process 400 may include generating deidentified data based on the one or more substitution values (block 470). For example, the device may generate deidentified data based on the one or more substitution values, as described above.

As further shown in FIG. 4, process 400 may include performing one or more actions based on the deidentified data (block 480). For example, the device may perform one or more actions based on the deidentified data, as described above. In some implementations, performing the one or more actions includes one or more of providing the deidentified data for display, or providing the deidentified data for medical research. In some implementations, performing the one or more actions includes one or more of providing the deidentified data for marketing research, or providing the deidentified data for software development. In some implementations, performing the one or more actions includes including the deidentified data in training data, and training a machine learning model with the training data.

In some implementations, process 400 includes converting, when each of the one or more hash codes is an alpha-numeric hash code and the one or more dictionaries are referenced by index, the one or more hash codes into one or more integers to aid in preventing reverse identification of the original data.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, original data to be deidentified;
   selecting, by the device, one or more dictionaries, from a plurality of dictionaries, based on the original data;
   sorting, by the device, the one or more dictionaries based on an output control key to generate one or more sorted dictionaries;
   hashing, by the device, the original data into one or more hash codes;
   extracting, by the device, a sequence of a quantity of digits, from each of the one or more hash codes, to generate one or more sequences;
   retrieving, by the device and from the one or more sorted dictionaries, one or more substitution values corresponding to the one or more sequences;
   generating, by the device, deidentified data based on the one or more substitution values; and
   performing, by the device, one or more actions based on the deidentified data.

2. The method of claim 1, further comprising:
   converting, when each of the one or more hash codes is an alpha-numeric hash code and the one or more dictionaries are referenced by index, the one or more hash codes into one or more integers to aid in preventing reverse identification of the original data.

3. The method of claim 1, wherein the quantity of digits is less than or equal to a quantity of digits in each of the one or more hash codes.

4. The method of claim 1, wherein the output control key is one of a random key or a static key.

5. The method of claim 1, wherein the output control key is a cryptographic key used for sorting.

6. The method of claim 1, wherein sorting the one or more dictionaries based on the output control key to generate the one or more sorted dictionaries comprises:
   generating a hash code from the output control key;
   determining an index based on the hash code;
   performing an exclusive or operation based on the index to generate a sort order; and
   sorting the one or more dictionaries based on the sort order to generate the one or more sorted dictionaries.

7. The method of claim 1, wherein each original value, of the original data, corresponds to a single substitution value.

8. A device, comprising:
   one or more processors configured to:
      receive original data to be deidentified;
      select one or more dictionaries, from a plurality of dictionaries, based on the original data;
      sort the one or more dictionaries based on an output control key to generate one or more sorted dictionaries;
      hash the original data into one or more hash codes;
      convert, when each of the one or more hash codes is an alpha-numeric hash code and the one or more dictionaries are referenced by index, the one or more hash codes into one or more integers to aid in preventing reverse identification of the original data;
      extract a sequence of a quantity of digits or characters, from each of the one or more integers, to generate one or more sequences;
      retrieve, from the one or more sorted dictionaries, one or more substitution values corresponding to the one or more sequences;

generate deidentified data based on the one or more substitution values; and perform one or more actions based on the deidentified data.

9. The device of claim 8, wherein the one or more substitution values substantially resemble original values of the original data.

10. The device of claim 8, wherein each original value, of the original data, corresponds to a single substitution value.

11. The device of claim 8, wherein the one or more substitution values change based on a change to original values of the original data.

12. The device of claim 8, wherein the one or more processors, to perform the one or more actions, are configured to one or more of:

provide the deidentified data for display; or provide the deidentified data for medical research.

13. The device of claim 8, wherein the one or more processors, to perform the one or more actions, are configured to one or more of:

provide the deidentified data for marketing research; or provide the deidentified data for software development.

14. The device of claim 8, wherein the one or more processors, to perform the one or more actions, are configured to:

include the deidentified data in training data; and train a machine learning model with the training data.

15. A non-transitory computer-readable medium storing a set of instructions, the set of instructions comprising:

one or more instructions that, when executed by one or more processors of a device, cause the device to:

receive original data to be deidentified, wherein the original data includes one or more of:

textual data, numerical data, identifiers, or dual value attributes;

select one or more dictionaries, from a plurality of dictionaries, based on the original data;

sort the one or more dictionaries based on an output control key to generate one or more sorted dictionaries;

hash the original data into one or more hash codes;

extract a sequence of a quantity of digits or characters, from each of the one or more hash codes, to generate one or more sequences;

retrieve, from the one or more sorted dictionaries, one or more substitution values corresponding to the one or more sequences;

generate deidentified data based on the one or more substitution values; and perform one or more actions based on the deidentified data.

16. The non-transitory computer-readable medium of claim 15, wherein the quantity of digits is less than or equal to a quantity of digits in each of the one or more hash codes.

17. The non-transitory computer-readable medium of claim 15, wherein the output control key is one of a random key or a static key.

18. The non-transitory computer-readable medium of claim 15, wherein the one or more instructions, that cause the device to sort the one or more dictionaries based on the output control key to generate the one or more sorted dictionaries, cause the device to:

generate a hash code from the output control key;

determine an index based on the hash code;

perform an exclusive or operation based on the index to generate a sort order; and sort the one or more dictionaries, based on the sort order, to generate the one or more sorted dictionaries.

19. The non-transitory computer-readable medium of claim 15, wherein each original value, of the original data, corresponds to a single substitution value.

20. The non-transitory computer-readable medium of claim 15, wherein the one or more instructions, that cause the device to perform the one or more actions, cause the device to one or more of:

provide the deidentified data for display;

provide the deidentified data for medical research;

provide the deidentified data for marketing research;

provide the deidentified data for software development; or utilize the deidentified data as training data for training a machine learning model.

* * * * *